United States Patent [19]
Van Breemen

[11] Patent Number: 5,328,005
[45] Date of Patent: Jul. 12, 1994

[54] VALVE IN AN AIR SHOCK ABSORBER

[75] Inventor: Charles A. Van Breemen, Glen Ellyn, Ill.

[73] Assignee: Gabriel Ride Control Products, Inc., Carol Stream, Ill.

[21] Appl. No.: 992,839

[22] Filed: Dec. 18, 1992

[51] Int. Cl.$^5$ .............................................. F16F 9/43
[52] U.S. Cl. ............................ 188/322.21; 188/322.13
[58] Field of Search ............. 188/319, 322.13, 322.21; 267/64.28; 137/493.9, 512.15, 843, 493.8, 851, 855; 16/66, 84

[56] References Cited

U.S. PATENT DOCUMENTS

| | | | |
|---|---|---|---|
| 2,223,944 | 12/1940 | Roy | 251/219 |
| 2,507,267 | 5/1950 | Patriquin | 188/320 |
| 3,042,926 | 7/1962 | Shepard | 2/2.1 |
| 3,149,830 | 9/1964 | Broadwell | 267/64.28 |
| 3,633,605 | 1/1972 | Smith | 137/512.15 |
| 3,757,910 | 9/1973 | Palmer | 137/493.9 |
| 3,830,249 | 8/1974 | Fleenor et al. | 137/224 |
| 3,982,559 | 9/1976 | Ochs | 177/455 |
| 3,996,957 | 12/1976 | Goldish et al. | 137/224 |
| 4,015,623 | 4/1977 | Wanstreet | 137/224 |
| 4,015,624 | 4/1977 | Wanstreet et al. | 137/224 |
| 4,064,897 | 12/1977 | Weber | 137/224 |
| 4,109,767 | 8/1978 | Nandyal | 188/315 |
| 4,342,329 | 8/1982 | Roff | 137/493.9 |
| 4,427,022 | 1/1984 | Forney | 137/224 |
| 4,838,300 | 6/1989 | Seabase | 137/224 |
| 4,951,701 | 8/1990 | Boehmer | 137/493.9 |
| 5,054,511 | 10/1991 | Tuan et al. | 137/224 |

Primary Examiner—Matthew C. Graham
Assistant Examiner—Chris Schwartz
Attorney, Agent, or Firm—McAndrews, Held & Malloy, Ltd.

[57] ABSTRACT

A two-way valve for introducing pressurized air into the air chamber of an air shock absorber, and for maintaining a preselected minimum pressure within the air chamber. The valve includes a valve body and a valve cover mounted thereon. The valve body has an orifice in communication with the air chamber, and the valve cover has a fluid port in communication with a source of pressurized air. The valve cover includes a downwardly extending exhaust seat which surrounds the fluid port. Disposed within a recessed chamber in the valve body are an armature, an elastomeric diaphragm mounted on and supported by the armature, and a spring arrangement operatively positioned between the armature and the floor of the recessed chamber. The diaphragm is adapted to engage the exhaust seat when the pressure outside the air chamber is greater than the pressure inside the air chamber to permit the free flow of pressurized air into the air chamber, is adapted to unseat from the exhaust seat when the pressure inside the air chamber is greater than the pressure outside the air chamber and exceeds a preselected minimum pressure, to permit the controlled flow of air out of the air chamber, and is adapted to engage the exhaust seat when the pressure inside the air chamber reaches the preselected minimum pressure.

18 Claims, 2 Drawing Sheets

1

VALVE IN AN AIR SHOCK ABSORBER

BACKGROUND OF THE INVENTION

The present invention relates in general to a valve by which fluid pressure is introduced into a pressure-receiving vessel, and which can automatically reduce the inner pressure within the vessel and maintain an inner pressure in the vessel at a preselected minimum value. The valve can be used in a variety of applications, including an inlet valve for pressurizing an air chamber in an air chamber shock absorber combination.

Air chamber shock absorbers have been known for many years. Such shock absorbers typically comprise a conventional piston and cylinder type shock absorber and an outer tubular member connected with the outwardly extending end of the piston rod of the shock absorber and disposed in surrounding relation with the cylinder of the shock absorber. A folded flexible air sleeve is provided between the outer tubular member and the outer tubular surface of the shock absorber so as to define therewith an air chamber capable of supporting a portion of the load of the sprung mass of the vehicle on the unsprung mass thereof. One example of such an air shock is disclosed in U.S. Pat. No. 3,149,830.

Operation of the air shock requires that at least a minimum pressure be maintained in the air chamber in order for the air sleeve to have a proper rolling action. If, for some reason, the air pressure in the air chamber is lost, the air sleeve may fold in on itself, creating a double fold which causes the shock absorber to lock up, resulting in failure of the load carrying capacity of the shock absorber. Even if the air sleeve does not develop a double fold, the lack of sufficient air pressure increases friction on the sleeve which ultimately results in the destruction of the sleeve. Air pressure may be lost, for example, if a leak develops in the conduit system that typically interconnects two such shock absorbers mounted on a vehicle.

The problem of air pressure loss has been recognized for many years and various solutions have been proposed. One such solution, proposed in U.S. Pat. No. 3,149,830, is to mount a conventional tire valve, which includes a conventional check valve, on the outer tubular member of the air shock. The tire valve permits pressurized air to be introduced into the air chamber, and the check valve is normally spring pressed to prevent the air in the air chamber from communicating with the atmosphere.

While the conventional tire valve adequately functions to allow the pressurized air to be introduced into and maintained with the air chamber, the valve suffers from several disadvantages. For example, the tire valve requires that the pressurized air filling operation be precisely gauged to prevent overfilling or underfilling of the air chamber. Moreover, the tire valve does not have any means for venting or relieving an increase in pressure in the air chamber, except by manually removing the check valve.

SUMMARY OF THE INVENTION

Accordingly, it is an object of the present invention to provide a two-way valve that vents excess pressure from a pressurized fluid receiving vessel.

It is a further object of the invention to provide a two-way valve that permits the introduction of pressurized fluid into a pressurized fluid receiving vessel without the need for precise gauging or attention from operators during the filling operation.

A further object of the invention is to provide a two-way valve that permits the free flow of fluid into a fluid receiving vessel and exhausts fluid from the vessel until a preselected pressure within the vessel is obtained.

Another object of the invention is to provide a valve that maintains a preselected minimum pressure within the fluid receiving vessel.

Another object of the invention is to provide a two-way valve design that is simple in construction, inexpensive to manufacture, and easy to install.

A further object of the invention is to provide a two-way, air shock absorber valve that vents excess pressure from the air chamber, that has a negligible pressure drop across the inlet side of the valve, and that maintains a preselected minimum pressure within the air chamber, thus preventing loss of pressure within the chamber and damage to the air sleeve.

A still further object is to provide a valve having a valve body and cover the together define an air cavity, a flexible diaphragm disposed within the cavity and dividing the cavity into two chambers; where one of the chambers includes a port in communication with a source of pressure; where the other chamber has a port in communication with said pressurized fluid receiving vessel; where an annular intake seat is disposed around the circumference of the diaphragm; where an annular exhaust port surrounds the fluid pressure port; where the diaphragm is supported by a rigid armature; where an annular passage extends through the armature and diaphragm so as to allow fluid flow from the pressure source past the diaphragm and through the port in communication with the vessel.

These and other objects are achieved by a two-way valve which includes a valve body having a recessed portion, and a fluid-receiving orifice through the valve body which communicates with a pressurized fluid-receiving vessel. A valve cover is positioned on the valve body and has a fluid-receiving port in communication with a source of pressurized fluid, and an exhaust seat surrounding the port. A support is disposed within the recessed portion of the valve body and includes a passage for receiving the pressurized fluid from the fluid-receiving port when the fluid pressure outside the vessel is greater than the fluid pressure inside the vessel. A flexible diaphragm is positioned on the support and is adapted to engage the exhaust seat when the fluid pressure outside the vessel is greater than the fluid pressure within the vessel, adapted to unseat from the exhaust seat when the fluid pressure inside the vessel is greater than the fluid pressure outside the vessel and exceeds a preselected minimum pressure, and adapted to engage the exhaust seat when the pressure inside the vessel reaches the preselected minimum pressure.

BRIEF DESCRIPTION OF THE DRAWINGS

An embodiment of the invention will now be described by way of example with reference to the accompanying drawings in which.

DETAILED DESCRIPTION OF THE PREFERRED EMBODIMENT

Figure 1:
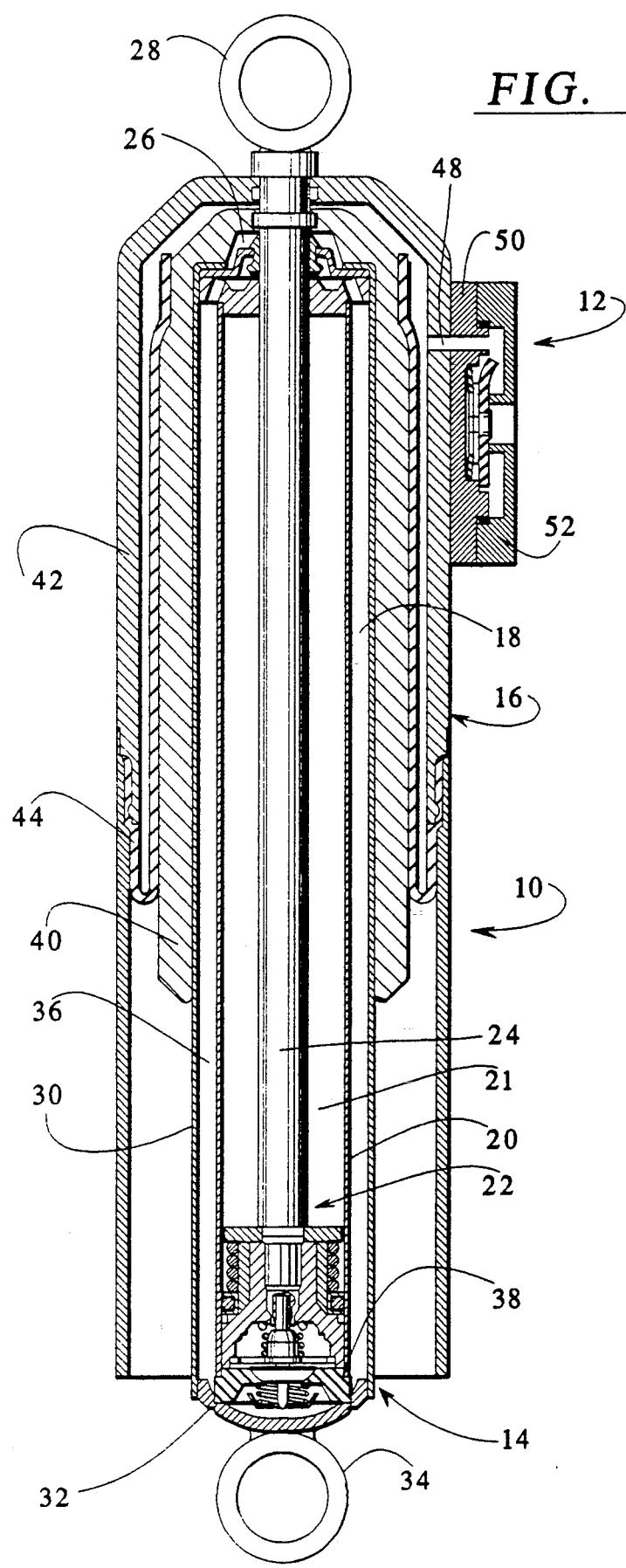
FIG. 1 is a vertical sectional view of an air shock absorber employing a two-way valve embodying the principles of the present invention.

Referring now to FIG. 1, there is shown an air shock absorber, generally indicated at 10, which includes a two-way valve, generally indicated at 12, which embodies the principles of the present invention. Although the valve 12 is illustrated and described in connection with an air shock absorber, it will be appreciated by those skilled in the art that the valve may be used in other applications and with other types of fluid pressure receiving vessels. For example, the valve could be used in a truck air brake system, or in a tire deflation system used by certain military vehicles for deflating tires for off-road navigation. The term "fluid" used herein is intended to include both gaseous and liquid fluids, since the two-way valve can be adapted for use with either.

The basic components of the air shock absorber 10 include a conventional piston and cylinder type shock absorber, generally indicated at 14, and a suspension assembly, generally indicated at 16, defining a load supporting air chamber 18 adjacent the upper portion of the shock absorber 14.

In general it can be stated that the shock absorber 14 is constructed in the manner set forth in U.S. Pat. No. 2,507,267. The disclosure of the patent is hereby incorporated by reference into the present specification. For present purposes, it is sufficient to note that the shock absorber 14 includes an inner tubular member 20, which defines a cylindrical chamber 21 within which is slidably mounted a piston assembly 22. While the details of construction of the piston assembly are not shown in the drawings, it will be understood that appropriate restricted orifices are provided by the assembly to permit passage of hydraulic fluid within the inner tubular member 20 from the upper portion thereof to the lower portion thereof, and vice versa. A piston rod 24 is connected with the piston assembly and extends upwardly therefrom. The piston rod 24 extends outwardly from an end closure member 26 and the outer end of the piston rod has an appropriate connector 28 fitted thereon which connects the air shock absorber 10 to the sprung mass of the vehicle.

The end closure member 26 is fixed to the upper end of the inner tubular member 20 and also receives the upper end of an outer tubular member 30.

The exterior of the inner tubular member 20 and the interior of the outer tubular member 30 together define an annular replenishing chamber 36 which is partially filled with hydraulic fluid.

The lower end of the outer tubular member 30 has an end cap or closure 32 fixed thereto which, in turn, has a connector 34 fixed to the central exterior thereof for connecting the lower end of the air shock absorber 10 with the unsprung mass of the vehicle.

The end closure 32 is provided with a base valve assembly, generally indicated at 38, of conventional construction. The base valve assembly includes a combined compression and replenishing valve which is constructed generally in accordance with the disclosure contained in U.S. Pat. No. 4,109,767, the disclosure of which is hereby incorporated by reference into the present specification. The valve assembly permits passage of hydraulic fluid from the lower end of the cylindrical chamber 21 into the replenishing chamber 36 and vice versa. This movement of hydraulic fluid to and from the replenishing chamber through the valve assembly 38 is, in accordance with conventional practice, necessary because of the piston rod displacement in the upper portion of the cylindrical chamber.

The suspension assembly 16 of the air shock absorber includes an inner cylindrical wall 40 mounted to the outer tubular member 30 for relative movement therewith, and an outer cylindrical wall 42 mounted on the piston rod and spaced outwardly from and surrounding the inner cylindrical wall 40. Mounted between the outer cylindrical wall 42 and the inner cylindrical wall 40 is a folded elastomeric air sleeve 44 which, together with the inner outer cylindrical walls, defines the air chamber 18. The ends of the air sleeve are fixedly secured to the inner and outer walls 40 and 42, respectively, by any conventional means.

The inner and outer cylindrical walls are movable relative to one another to vary the volume in the air chamber 18 in response to relative movements between the shock absorber parts. In order to effect a proper rolling action of the air sleeve 44 so that the volume in the air chamber can vary, a minimum pressure, preferably about 15 p.s.i.g., must be maintained within the air chamber 18.

In order to introduce air under pressure and maintain the minimum pressure within the air chamber 18, there is provided the two-way valve 12 embodying the principles of the present invention. The valve 12 is mounted on the upper end of the outer cylindrical wall 42 and includes a valve body 50 and a valve cover 52.

Figure 2:
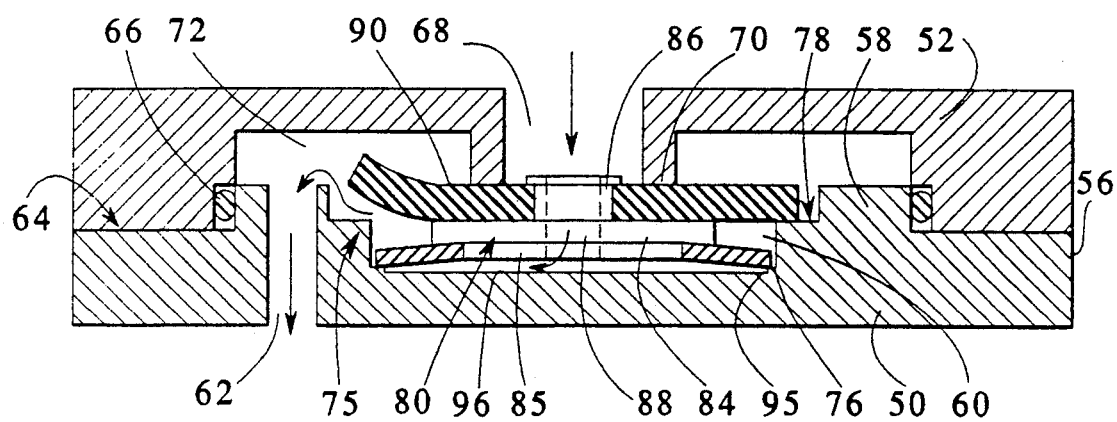
FIG. 2 is a vertical sectional view of the two-way valve of the present invention showing the valve in its free flow position.
Figure 3:
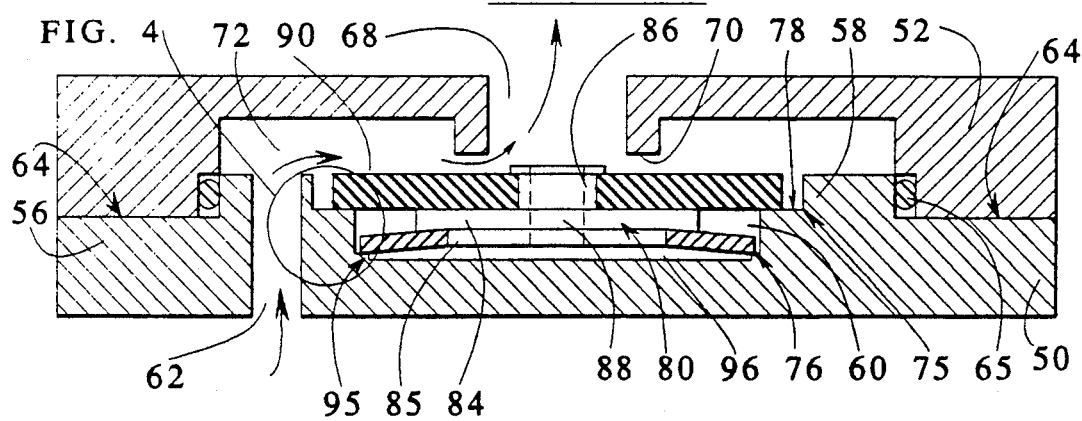
FIG. 3 is a view similar to FIG. 2 showing the valve in its protected flow position.
Figure 4:
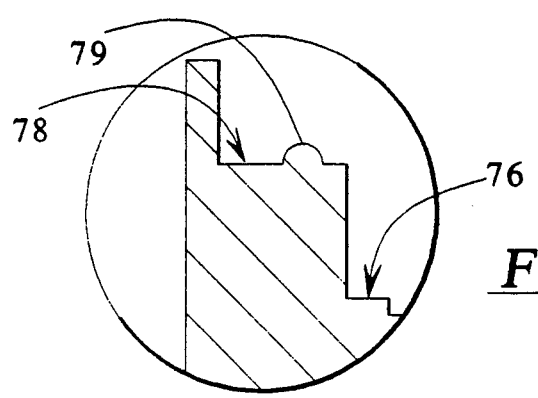
FIG. 4 is an enlarged view of the circled portion of FIG. 3.

Referring now to FIGS. 2-4, the valve body 50 has an outwardly extending annular flange 56 and an inner annular portion 58 which defines a centrally positioned recessed chamber 60. An orifice 62 extends through the inner annular portion 58 and is aligned with an opening 48 (see FIG. 1) through the outer cylindrical wall 42 to allow pressurized air to flow through the valve body and into and out of the air chamber 18, as will be explained hereafter in further detail.

The cover 52 has a downwardly extending annular flange 64 which is adapted to mate with the upper surface of the annular flange 56 on the valve body. The cover is affixed to the valve body by engaging threaded screws in aligned threaded holes (not shown) through the annular flanges 64 and 56 on the valve cover and body, respectively. An o-ring 66 is positioned on the annular flange 56, adjacent the inner annular portion 58, to seal the connection between the valve cover 52 and the valve body 50.

Centrally positioned in the cover 52 is a fluid port 68 which is in communication with an external source of pressurized air (not shown). The fluid port 68 permits air to enter into and exit from the valve 12. Surrounding the fluid port 68 and coaxial therewith is a downwardly extending annular exhaust seat 70. When the cover 52 is fastened to the valve body 50, the exhaust seat 70 and the annular flange 64 define an annular air space 72 which facilitates the flow of air from the fluid port 68 to the orifice 62.

The recessed chamber 60 in the body 50 has an annularly stepped sidewall 75. The lowest step of the sidewall is positioned just above the floor of the chamber 60 and defines an annular spring seat 76. A second step 78 is positioned above the annular spring seat 76 and is provided with an annular inlet seat 79 as shown in FIG. 4. The second step 78 has a diameter greater than that of the spring seat 76.

Centrally aligned within the recessed chamber 60 are a rigid plastic armature 80, a flat flexible diaphragm 90 mounted on the upper surface of the armature, and a spring arrangement 95 operatively positioned between the armature and the floor of the chamber 60. The diaphragm 90 and the spring arrangement 95 are positioned within the chamber 60 so that the diaphragm seats on the inlet seat 79 and the spring arrangement 95 seats on the spring seat 76.

The armature 80 has a flat cylindrical body 84 with an annularly inset portion 85 on the lower surface of the body, and a cylindrical spindle 86 projecting above the upper surface of the body. A central passage 88 extends through the spindle 86 and the armature body 84 and is axially aligned with the fluid port 68.

The elastomeric diaphragm 90 is mounted on the armature 80 and has a central circular opening for receiving the spindle. Preferably, the circular opening of the diaphragm 90 has a diameter smaller than that of the spindle so that, as the diaphragm is mounted on the armature, the spindle causes the diaphragm to be stretched and thereby frictionally engaged on the spindle. The diaphragm has an outer diameter that is larger than the diameter of the armature body 84, leaving the outer periphery of the diaphragm unsupported by the armature.

The spring arrangement 95 is preferably a pair of conventional Belleville springs, although other types of springs, for example, a coil spring, could be employed. The springs each have a centrally positioned hole therethrough of sufficient diameter to receive the annularly inset portion 85, but of smaller diameter than the armature body 84. This difference in diameter enables the spring arrangement 95 to keep the armature 80 raised above the floor of the recessed chamber 60, creating an air space 96 between the armature and the chamber floor.

When the pressure outside the air shock absorber is greater than the pressure inside the air chamber 18, the valve arrangement permits the free flow of air into the air chamber, as illustrated in FIG. 2. During the free flow mode, the upper surface of the diaphragm 90 is urged into engagement with the exhaust seat 70 by the spring arrangement 95. Pressurized air flows from the fluid port 68, through the central passage 88 in the armature, and into the air space 96 beneath the armature. The air then flows around the spring arrangement 95 and reaches the lower side of the diaphragm 90. Because the outer periphery of the diaphragm is unsupported, when the pressure exerted by the air on the lower side of the diaphragm exceeds the internal resistance of the diaphragm, the diaphragm unseats from the inlet seat 79, and flexes into the annular air space 72. The air then flows past the flexed diaphragm, through the orifice 62 and into the air chamber 18.

When the pressure inside the air chamber 18 exceeds the preselected minimum pressure, preferably 15 p.s.i.g., the valve permits air to flow out of the air chamber in accordance with the valve arrangement illustrated in FIG. 3. As the air flows from the orifice 62 and into the annular air space 72, it reaches the upper surface of the diaphragm 90. The internal resistance of the diaphragm 90, as well as the pressure from the air on the upper surface of the diaphragm, cause the outer periphery of the diaphragm to seat against the inlet seat 79. When the air pressure acting on the upper surface of the diaphragm exceeds the load on the spring arrangement 95, the diaphragm unseats from the exhaust seat 70. The air then exits the valve through the fluid port 68, as shown by the arrows in FIG. 3.

When the pressure inside the air chamber 18 reaches about 15 p.s.i.g., the air pressure exerted on the upper surface of the diaphragm 90 is insufficient to overcome the load on the spring arrangement 95, causing the springs to urge the diaphragm into engagement with the exhaust seat, as shown in FIG. 2. In order to achieve the proper spring load so that the diaphragm engages the exhaust seat when the minimum pressure inside the air chamber is reached, it is preferable that the Belleville springs are arranged in series. It will be appreciated that the particular size and arrangement of the springs will vary depending upon the minimum pressure selected to be maintained within the air chamber.

Thus, it can be seen that the valve arrangement of the present invention acts as a check valve to insure that a minimum pressure will always be retained within the air chamber 18, thereby preventing damage to the air sleeve and lock up of the shock absorber. This minimum pressure is retained within the air chamber even though the pressure outside the shock absorber may be atmospheric, as, for example, when a leak occurs in the system which delivers the pressurized air to the shock absorber.

It will be appreciated that the two-way valve disclosed herein may be embodied in other specific forms without departing from the spirit or central characteristics thereof. The valve may be located remote from the shock absorber, for instance, as a part of an air dryer applying dry pressurized air into the shock absorber as a part of a pressurized air reservoir. It will also be appreciated that the valve may have application in other devices which require that a certain minimum pressure be retained within a pressure-receiving vessel. The preferred embodiment described herein is therefore to be considered in all respects as illustrative and not restrictive, the scope of the invention being indicated by the appended claims, rather than by the foregoing description of the preferred embodiment, and all changes which come within the meaning and range of equivalency of the claims are intended to be embraced therein.

What is claimed is:

1. In an air shock absorber adapted to be connected between the sprung mass and the unsprung mass of a vehicle including a tubular member defining a cylindrical chamber, a piston slidably mounted within said cylindrical chamber, a piston rod extending from one side of said piston outwardly from one end of said tubular member, closure means on said one end of said tubular member closing the one end of said tubular member and slidably sealingly engaging said piston rod, end closure means on the opposite end of said tubular member, connecting means for connecting said shock absorber operably between said masses, an inner cylindrical wall positioned outwardly from said tubular member, an outer cylindrical wall spaced outwardly from and surrounding said inner cylindrical wall, a folded rolling sleeve mounted between said inner and outer cylindrical walls and defining therewith an air chamber, and a valve mechanism for introducing pressurized air into said air chamber, the improvement wherein said valve mechanism comprises:

a) a valve body having a cavity, and having a orifice therethrough in communication with the air chamber;
   b) a valve cover positioned on the valve body, the valve cover having a port therethrough in communication with a source of pressurized air, and an exhaust seat surrounding the port;

c) a support disposed within the cavity of the valve body, the support having a passage therethrough in fluid communication with the port when the air pressure from the source of pressurized air is greater than the air pressure within the air chamber; and d) a flexible diaphragm positioned on the support, the diaphragm adapted to engage the exhaust seat when the air pressure in the source of pressurized air is greater than the air pressure within the air chamber, adapted to unseat from the exhaust seat when the air pressure inside the air chamber is greater than the air pressure from the source of pressurized air and exceeds a pre-selected minimum pressure, and adapted to engage the exhaust seat when the pressure inside the air chamber reaches the pre-selected pressure.

2. The improvement according to claim 1, wherein the valve mechanism further includes means for biasing the diaphragm to engage the exhaust seat when the air pressure from the source of pressurized air is greater than the air pressure inside the air chamber.

3. The improvement according to claim 2, wherein the means for biasing are Belleville springs operatively arranged within the cavity.

4. An air shock absorber adapted to be connected between the sprung mass and unsprung mass of a vehicle comprising a tubular element, a cylinder within said tubular element and defining therewith an annular replenishing chamber, a piston slidably mounted within said cylinder, a piston rod connected at one end with the piston for movement therewith and extending outwardly from one end of the cylinder, means for permitting controlled flow of hydraulic fluid into said cylinder and said replenishing chamber in response to said movement of said piston within said cylinder, means on the outwardly extending end of said piston rod for connecting the outwardly extending end to one of said masses, means for connecting the opposite end of said cylinder to the other of said masses, an inner cylindrical suspension part mounted adjacent said tubular element, an outer cylindrical suspension part mounted on said piston rod and outwardly spaced from said inner cylindrical suspension part, a folded rolling sleeve mounted between said inner and outer suspension parts and defining therewith an air chamber, a valve mounted on said outer suspension part in communication with said air chamber to provide for the introduction and exit of air under pressure into and out of said air chamber and for maintaining a pre-selected minimum pressure within said air chamber, the valve comprising a valve body having a cavity, and an orifice therethrough in communication with the air chamber, a valve cover positioned on the valve body and having a fluid port therethrough in communication with a source of pressurized air and an exhaust seat surrounding the fluid port, a support disposed within the cavity of the valve body and having a passage therethrough in fluid communication with the fluid port when the air pressure from the source of pressurized air is greater than the air pressure within the air chamber, and a flexible diaphragm positioned on the support and adapted to engage the exhaust seat when the air pressure outside the air chamber is greater than the air pressure within the air chamber, adapted to unseat from the exhaust seat when the air pressure inside the chamber is greater than the air pressure outside the air chamber and exceeds the pre-selected minimum pressure, and adapted to engage the exhaust seat when the pressure inside the air chamber reaches the preselected minimum pressure.

5. An air shock absorber according to claim 4, which includes means for biasing the diaphragm to engage the exhaust seat when the air pressure outside the air chamber is greater than the air pressure inside the air chamber.

6. The air shock absorber according to claim 5, wherein the means for biasing are Belleville springs operatively arranged within the cavity.

7. A two-way pressure valve for pressurizing an air chamber in an air shock absorber and for maintaining a pre-selected minimum pressure within the air chamber, the valve comprising:

a) a valve body having a cavity, and having an orifice through the valve body which communicates with the air chamber;

b) a valve cover positioned on the valve body, the valve cover having a port therethrough in communication with a source pressurized air and an exhaust seat surrounding the port;

c) a support disposed within the cavity of the valve body, the support having a passage therethrough in fluid communication with the port when the air pressure outside the air chamber is greater than the air pressure within the chamber; and d) a flexible diaphragm positioned on the support, the diaphragm adapted to engage the exhaust seat when the air pressure outside the air chamber is greater than the air pressure within the air chamber, adapted to unseat from the exhaust seat when the air pressure inside the air chamber is greater than the air pressure outside the air chamber and exceeds the pre-selected minimum pressure, and adapted to engage the exhaust seat when the pressure inside the air chamber reaches the pre-selected pressure.

8. A two-way valve according to claim 7, which includes means for biasing the diaphragm to engage the exhaust seat when the air pressure outside the air chamber is greater than the air pressure inside the air chamber.

9. The two-way valve according to claim 8, wherein the means for biasing are Belleville springs operatively arranged within the cavity.

10. A two-way valve according to claim 7, wherein the valve body includes an inlet seat disposed within the cavity.

11. A two-way valve according to claim 10, wherein the diaphragm has a periphery that extends beyond the support and engages the inlet seat, and the diaphragm is adapted to engage the exhaust seat and to unseat from the inlet seat when the air pressure outside the air chamber is greater than the air pressure within the air chamber, is adapted to engage the inlet seat and unseat from the exhaust seat when the air pressure inside the air chamber is greater than the air pressure outside the air chamber and exceeds the pre-selected minimum pressure, and is adapted to engage the exhaust seat and the inlet seat when the pressure inside the air chamber reaches the pre-selected minimum pressure.

12. The two-way valve according to claim 11, wherein the perphiery of the diaphragm is adapted to flex away from the inlet seat to allow pressurized air to flow past the flexed diaphragm and into the air chamber when the pressure outside the air chamber is greater than the pressure inside the air chamber.

13. A two-way valve for introducing a pressurized fluid from a source of pressurized fluid into a vessel and for maintaining a pre-selected minimum pressure within the vessel, the valve comprising:
  a) a valve body having a recessed portion, and having a fluid-receiving orifice through the valve body in communication with the vessel;
  b) a valve cover positioned on the valve body, the valve cover having a fluid port therethrough which communicates with the source of pressurized fluid, and an exhaust seat surrounding the fluid port;
  c) a support disposed within the recessed portion of the valve body, the support having a passage therethrough in fluid communication with the fluid port when the fluid pressure outside the vessel is greater than the fluid pressure within the vessel; and
  d) a flexible diaphragm positioned on the support, the diaphragm adapted to engage the exhaust seat when the fluid pressure outside the vessel is greater than the fluid pressure within the vessel, adapted to unseat from the exhaust seat when the fluid pressure inside the vessel is greater than the fluid pressure outside the vessel and exceeds the pre-selected minimum pressure, and adapted to engage the exhaust seat when the pressure inside the vessel reaches the pre-selected minimum pressure.

14. A two-way valve according to claim 13, which includes means for biasing the diaphragm to engage the exhaust seat when the air pressure outside the vessel is greater than the air pressure inside the vessel.

15. The two-way valve according to claim 14, wherein the means for biasing are Belleville springs arranged in parallel within the recessed portion of the valve body.

16. A two-way valve according to claim 13, wherein the valve body includes an inlet seat disposed within the recessed portion.

17. A two-way valve according to claim 16, wherein the diaphragm has a periphery that extends beyond the support and engages the inlet seat, and the diaphragm is adapted to engage the exhaust seat and to unseat from the inlet seat when the air pressure outside the vessel is greater than the air pressure within the vessel, is adapted to engage the inlet seat and unseat from the exhaust seat when the air pressure inside the vessel is greater than the air pressure outside the vessel and exceeds the pre-selected minimum pressure, and is adapted to engage the exhaust seat and the inlet seat when the pressure inside the vessel reaches the pre-selected minimum pressure.

18. The two-way valve according to claim 17, wherein the perphiery of the diaphragm is adapted to flex away from the inlet seat to allow pressurized air to flow past the flexed diaphragm and into the vessel when the pressure outside the vessel is greater than the pressure inside the vessel.

* * * * *